Patented Oct. 17, 1933

1,930,488

UNITED STATES PATENT OFFICE 1,930,488

ART OF PURIFYING PETROLEUM SULPHONIC ACIDS DERIVED FROM THE TREATMENT OF MINERAL OILS WITH SULPHURIC ACID

Kolachala Seeta Ramayya, Brooklyn, N. Y., assignor to L. Sonneborn, Sons, Inc., a corporation of New York No Drawing. Application November 12, 1930
Serial No. 495,304

4 Claims. (Cl. 260—159)

My process is applicable to the said acids either in free condition or combined with bases. The term "sulphonic acid" may be hereinafter generically employed in the description and claims to designate the said acids in both free and combined state.

Certain highly refined petroleum products, such as for example white lubricating oils, medicinal oils and certain grades of transformer oils, are produced by the treatment of a petroleum distillate with fuming sulphuric acid. The distillate so treated is ordinarily a lubricating oil distillate, that is its viscosity is higher than the viscosity ordinarily found in gas oil distillates, and its average boiling point is higher than the average boiling point of gas oils. In treating a distillate of the type described, it is ordinarily mixed and agitated with a batch of fuming sulphuric acid. The concentration of fuming acid employed may vary from several percent of uncombined $SO_3$ up to pure sulphuric anhydride, and all such concentrations, including the anhydride, may be hereinafter embraced by the term "fuming sulphuric acid". The amount of fuming sulphuric acid applied may vary for any individual treat from 3 to about 20% by volume of the original quantity of oil treated. After agitating the distillate and acid together, the mixture is permitted to settle; whereupon a heavy greenish to black colored sludge separates as a lower layer and may be withdrawn. This sludge contains unconsumed sulphuric acid together with certain organic acids derived from the interaction of the fuming sulphuric acid with the oil. These organic acids may compose from 25 to 75% of the total sludge, depending upon the oil treated, mode of treatment and number of previous treats. The sludge organic acids are only limitedly soluble in hydrocarbon oils, if at all, but are highly water soluble. The free acids in aqueous solution are dark green in color, and for this reason these acids are generally referred to as green petroleum sulphonic acids. The green petroleum sulphonic acids are at times produced by the action of strong sulphuric acid (non-fuming), for example of from 98 to 100%, $H_2SO_4$ content, on certain lubricating oil distillates and in relatively impure form may be separated from the sludge thereby produced by a process of water washing.

The fuming sulphuric acid treatment simultaneously produces other types of sulphonic acids which are predominantly oil soluble, and may be found in the supernatant oil to the extent of a few percent after each treat and separation of sludge. These acids impart a reddish color to the oil containing the same, and for this reason are generally referred to as "mahogany petroleum sulphonic acids". The mahogany petroleum sulphonic acids may be extracted from the oil containing the same at the expiration of each acid treat, but in commercial practice are ordinarily separated at one or two stages in the succession of sulphuric acid treatments. The point of separation is ordinarily determined by commercial considerations concerning the quality of finished oil required and the economy and ease of treatment. The mahogony sulphonic acids are also produced at times by the action of strong (non-fuming) sulphuric acid, say of from 98 to 100%, $H_2SO_4$ content, on certain lubricating oil distillates, although for commercial reasons they are not usually recovered from such treatment in usuable form.

After separation of the sludge hereinbefore referred to, the mahogany sulphonic acids are in commercial practice usually selectively extracted from the hydrocarbon oil containing the same by admixing the oil with a solvent consisting of an aqueous solution of a mono hydroxyl alcohol of not exceeding 3 carbon atoms. The water must be present in sufficient amount to render the alcoholic solution substantially immiscible in the oil, and in practice a solution containing from 40 to 60% of alcohol is preferred, although a solution containing from 25 to 75% may be employed if desired.

The mahogany sulphonic acids pass principally into the alcoholic solution, and after settling and stratification the alcoholic solution containing the organic acids may be withdrawn. In the preferred practice, the mahogany sulphonic acids are ordinarily neutralized at or prior to the application of the alcoholic solution with the formation of inorganic salts thereof. Bases forming water soluble salts, such as ammonia and sodium carbonate or hydroxide, are preferred for this purpose. The salts of the mahogany acids may be recovered by distilling off the solvent, and in this case will be found to contain a substantial proportion of the hydrocarbon oil from which they were extracted. This oil is, per se, relatively insoluble in the alcoholic solution but is presumably carried into solution by the sulphonic acid salts. For many purposes the sulphonic acid salts may be directly utilized, and the presence of the oil is not detrimental; but for more extended utilizations the presence of the oil is detrimental and its removal is desirable. The salts with the oil present are somewhat sticky and will flow, although slowly, at normal temperatures. With the oil removed the salts are brittle and resin like.

I have found that the mahogany sulphonic acids, including the salts of these acids with bases, may be purified and substantially freed from the associated oil by dissolving the same in a solvent consisting principally of water and an oxygenated hydrocarbon, preferably containing one or more hydroxyl groups, and agitating the solvent containing the said sulphonic acids in free or combined state with a light, petroleum, hydrocarbon preferably non-aromatic. The amount of water and oxygenated hydrocarbon should be so balanced that the solvent is not miscible in the light petroleum hydrocarbon but remains as a separate and distinct liquid phase. A light petroleum hydrocarbon may be defined for purposes of this application to consist of a hydrocarbon, or mixture of hydrocarbons, boiling predominantly below 300° C. A mixture of hydrocarbons of the type referred to may be separated from crude petroleum or distillates thereof by distillation. Where a mixture of hydrocarbons is employed it preferably consists predominantly of non-aromatic hydrocarbons. The term "aromatic hydrocarbons" is used to designate benzol and homologues and does not include naphthenes. Ordinarily, petroleum naphtha, which is a mixture of hydrocarbons boiling predominantly below 300° C., is preferred by reason of its cheapness and general availability; although closer cut fractions and/or pure hydrocarbons may be employed, if desired, if falling within the aforementioned boiling point range. Paraffins or naphthenes may be employed. The hydrocarbon selectively extracts the oil leaving the sulphonic acid or salt thereof in the aqueous solution. After mixing the two together, settling is permitted, whereupon stratification takes place. The hydrocarbon phase is preferably withdrawn and fresh hydrocarbon is applied on one or more succeeding occasions to insure the complete removal of the oil from the sulphonic acid or salt thereof. The sulphonic acids may then be recovered, if desired, by evaporating off the aqueous solvent. The free mahogany sulphonic acids are not entirely stable when heated, and for best results should be neutralized before evaporating the solvent. An alkali metal base is preferred and the evaporation is preferably carried on by the use of indirect steam-heat. If an aqueous solution of the sulphonate is desired, the distillation may be carried only to the point of recovering the alcohol and/or a part of the water. If a relatively dry-sodium sulphonate is desired, the evaporation may be carried to completion in open pans or by the use of a drum drier.

The preferred solvent for the mahogany sulphonic acids is an aqueous solution of a mono hydroxyl alcohol of not exceeding 3 carbon atoms, the proportions of water and alcohol being such as to render the solvent immiscible with the light hydrocarbon and incapable of emulsifying therewith. In practice 40 to 60% of alcohol is effective for this purpose, and for this reason I find it convenient to use the alcoholic solution containing mahogany sulphonic acids or salts thereof which was produced by the selected extraction of these acids from the original lubricating oil distillate in which the acids were produced. Where the light hydrocarbon is applied to a solution containing only the mahogany acids or salts thereof the best efficiencies of selectively separating the associated hydrocarbon oil from the mahogany acids are obtained by maintaining the alcoholic solution slightly alkaline. My treatment is not, however, limited to the separation of the oil from a solution containing only the mahogany sulphonic acids or salts thereof, but may also be applied to a solution containing both the mahogany and green sulphonic acids or salts thereof. In the latter case, I find it to be unnecessary to maintain an alkaline solution in order to obtain highly satisfactory efficiencies on separating the associated hydrocarbon oil.

In case the alcoholic solution contains both mahogany and green sulphonic acids, the light hydrocarbon will also extract certain non-acid organic impurities which are found associated with the green sulphonic acids in the sludge. These non-acid organic impurities may consist of higher alcohols, thio-ethers, mercaptans, mustard oils, hydrocarbons, compounds of asphaltic nature, thio-alcohols and other materials of non-sulphonic character.

A mixture of the green and mahogany petroleum sulphonic acids, and especially a mixture purified as described, is of exceptional value as an emulsifying agent. While the green sulphonic acids are not, per se, oil soluble when mixed with the mahogany sulphonic acids and partly or completely dried, the mixture becomes completely oil soluble. The use of such mixture is the subject matter of my copending application Serial No. 495,305, filed November 12, 1930, and constitutes no part of the present invention.

In one practical example, I took 1000 gallons of a solution containing the sodium salts of the mahogany acids recovered in the process of manufacturing white medicinal oil from a petroleum distillate of lubricating characteristics. This solution contained alcohol and water in substantially equal proportions by volume together with approximately 30% by weight of the sodium salts of the mahogany acids. To this solution I added 100 gallons of gasoline of about 410° F. end point and intermixed the alcoholic solution and gasoline for a period of approximately one hour. At the expiration of the agitation the mixture was settled for three hours with the consequent formation and separation of four distinct layers. The bottom layer was semi-solid composed principally of inorganic salts and other impurities. The second layer was the alcoholic solution of the mahogany sulphonates, substantially free from oil. The third layer was not relatively large in volume and was semi-solid being composed essentially of organic impurities not soluble in the two liquid phases. The top layer was a gasoline solution containing the petroleum oil separated from the mahogany sulphonates. The gasoline layer was separated and recovered for reuse by distillation. The aqueous alcohol solution containing the sulphonates was separated and extracted a second time with 100 gallons of gasoline. At the expiration of the second extraction the aqueous alcohol solution was separated and distilled, leaving the purified sodium sulphonate as a residue.

The foregoing specific example is intended merely as an illustration and not as a limitation of the invention. It is therefore my intention that the invention be limited only by the appended claims or their equivalents in which I have endeavored to claim broadly all inherent novelty.

I claim:

1. Process of purifying impure salts of the group consisting of alkali metal salts and ammonium salts of the mahogany petroleum sulphonic acids derived from the treatment of a petroleum oil with sulphuric acid, which comprises dissolving such salts of the mahogany petroleum sulphonic acids in a solvent consisting predominantly of water and a mono hydroxyl alcohol of not exceeding 3 carbon atoms to the molecule, the water being present to the extent of from 25 to 75% by weight of the combined water and alcohol, thereby producing a mixture, agitating the said mixture with a petroleum hydrocarbon boiling predominantly below 300° C., permitting the said agitated materials to stratify, thereby producing a solvent layer and a hydrocarbon layer, separately collecting said solvent layer, and recovering the purified salts of the mahogany petroleum sulphonic acids from the said solvent layer.

2. Process of purifying impure salts of the group consisting of alkali metal salts and ammonium salts of the mahogany petroleum sulphonic acids derived from the treatment of a petroleum oil with fuming sulphuric acid, which comprises dissolving such salts of the mahogany petroleum sulphonic acids in a solvent consisting predominantly of water and a mono hydroxyl alcohol of not exceeding 3 carbon atoms to the molecule, the water being present to the extent of from 25 to 75% by weight of the combined water and alcohol, thereby producing a mixture, agitating the said mixture with a petroleum hydrocarbon boiling predominantly below 300° C., permitting the said agitated materials to stratify, thereby producing a solvent layer and a hydrocarbon layer, separately collecting said solvent layer, and recovering the purified salts of the mahogany petroleum sulphonic acids from the said solvent layer.

3. Process of purifying impure salts of the group consisting of alkali metal salts and ammonium salts of the petroleum sulphonic acids derived from the treatment of a petroleum oil with sulphuric acid, which comprises adding such impure salts of the mahogany and green sulphonic acids to a hydrocarbon immiscible solvent consisting predominantly of water and a mono hydroxyl alcohol of not exceeding 3 carbon atoms to the molecule, the water being present to the extent of from 25 to 75% by weight of the combined water and alcohol, thereby producing a mixture, agitating the said mixture with a petroleum hydrocarbon boiling predominantly below 300° C., permitting the said agitated materials to stratify, thereby producing a solvent layer and a hydrocarbon layer, separately collecting said solvent layer, and recovering the purified salts of the petroleum sulphonic acids from the said solvent layer.

4. Process of purifying impure salts of the group consisting of alkali metal salts and ammonium salts of the petroleum sulphonic acids derived from the treatment of a petroleum oil with fuming sulphuric acid, which comprises adding such impure salts of the mahogany and green sulphonic acids to a hydrocarbon immiscible solvent consisting predominantly of water and a mono hydroxyl alcohol of not exceeding 3 carbon atoms to the molecule, the water being present to the extent of from 25 to 75% by weight of the combined water and alcohol, thereby producing a mixture, agitating the said mixture with a petroleum hydrocarbon boiling predominantly below 300° C., permitting the said agitated materials to stratify, thereby producing a solvent layer and a hydrocarbon layer, separately collecting said solvent layer, and recovering the purified salts of the petroleum sulphonic acids from the said solvent layer.

KOLACHALA SEETA RAMAYYA.